Sept. 24, 1957     J. M. WALKER     2,807,267
PEA SHELLER
Filed Feb. 10, 1955
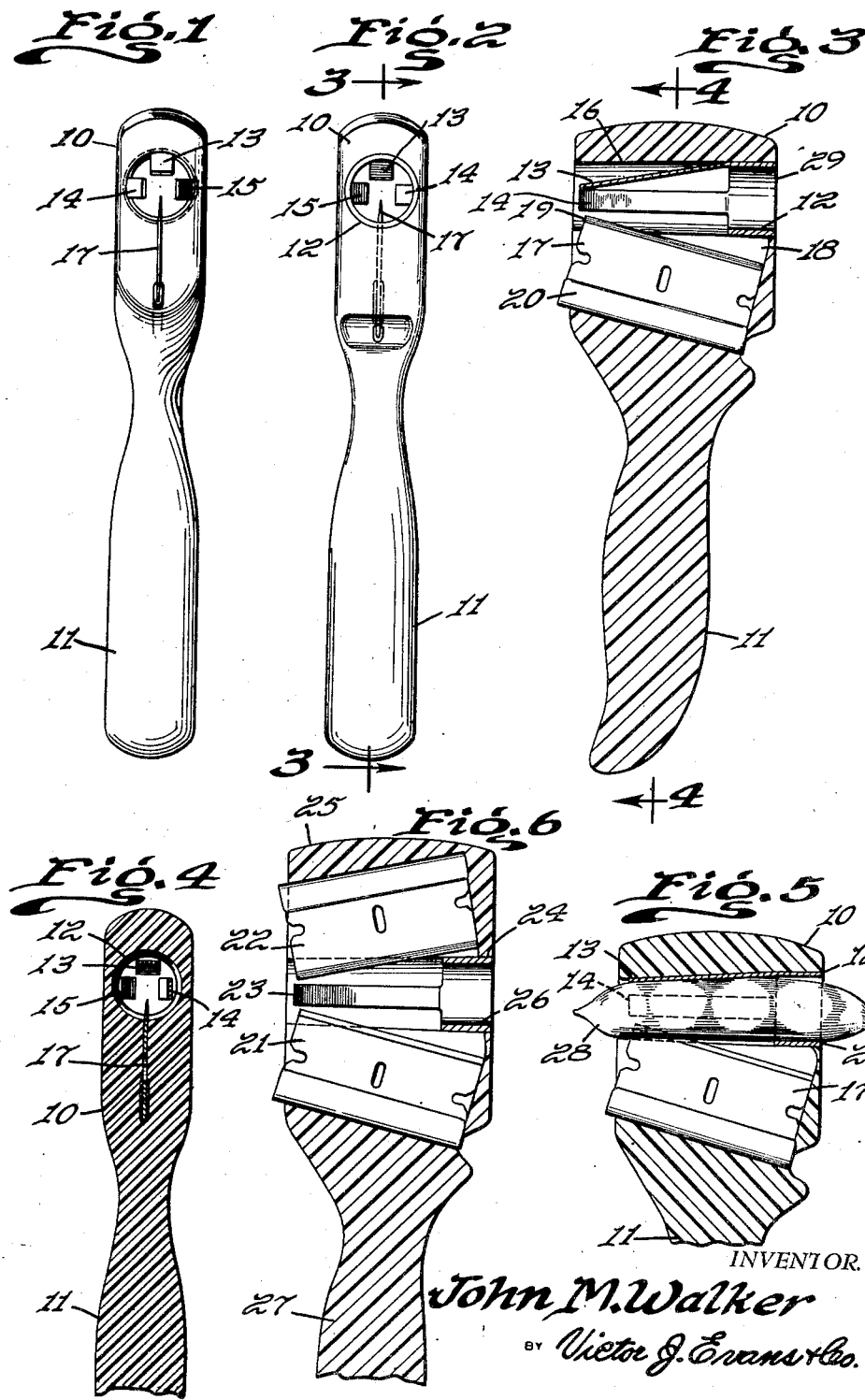
INVENTOR.
John M. Walker
BY Victor J. Evans & Co.
ATTORNEYS

United States Patent Office 2,807,267
Patented Sept. 24, 1957

2,807,267
PEA SHELLER

John M. Walker, Kilgore, Tex.

Application February 10, 1955, Serial No. 487,328

1 Claim. (Cl. 130—30)

This invention relates to kitchen utensils or tools for preparing vegetables for use, and in particular, a handle having a head with a bore therethrough and with spring fingers and a cutting blade extended into the bore, whereby with a shell having peas therein forced through the bore and spring fingers guide the shell toward the cutting blade and the blade cuts the shell.

The purpose of this invention is to provide means for removing peas from shells whereby the necessity of opening a shell with the thumb nail of an individual and removing peas from the shell by running a finger through the shell is obviated.

Various types of devices have been provided for preparing vegetables and the like for use and other picking and shell-opening devices have been provided for peas, however, it is difficult to remove peas from shells in quantities without leaving some peas in the shells and without damaging the peas. With this thought in mind, this invention contemplates a pea sheller having a sharp blade for definitely opening the pods or shells and also spring fingers for guiding the pea toward the blade whereby continuously longitudinally disposed slits are provided in the pods.

The object of this invention is, therefore, to provide means for forming a pea sheller whereby the pods or shells are definitely cut open.

Another object of the invention is to provide an improved pea sheller in which the parts are adapted to cut slits in both large and small peas without adjustments being made therein.

A further object of the invention is to provide an improved pea sheller which is of a simple and economical construction.

With these and other objects and advantages in view, the invention embodies a head having a handle extended therefrom with a tube positioned in a bore extended longitudinally through the head and with cutting means mounted in the head and extended into the tube to coact with spring fingers struck from the tube and extended inwardly toward the center thereof.

Other features and advantages of the invention will appear from the following description taken in connection with the drawing, wherein:

Figure 1 is an end elevational view looking toward the discharge end of the pea sheller showing the combination of the spring fingers and cutting knife or blade.

Figure 2 is an end elevational view looking toward the intake end of the pea sheller and also showing the combination of the spring fingers and cutting blade.

Figure 3 is a longitudinal section through the improved pea sheller taken on line 3—3 of Figure 2.

Figure 4 is a vertical section through the improved pea sheller taken on line 4—4 of Figure 3 and showing the device with the lower part of the handle broken away.

Figure 5 is a longitudinal section through the pea sheller, similar to that shown in Figure 3, showing a pea pod extended through the tube in the bore of the head of the pea sheller, the lower portion of the handle being broken away.

Figure 6 is a longitudinal section through the pea sheller, similar to that shown in Figure 3, illustrating a modification wherein a plurality of cutting elements are provided in the pea sheller.

Referring now to the drawing wherein like reference characters denote corresponding parts, the improved pea sheller of this invention includes a head 10 having a handle 11 extended therefrom, a tube 12 having spring fingers 13, 14 and 15 struck therefrom positioned in a bore 16 of the head and a cutting blade 17, such as a safety razor blade, positioned in a slot 18 and having a sharp cutting edge 19, one end of which extends into the bore 16 and tube 12.

In the design shown, the cutting blade 17 is a single-edge safety razor blade having a back 20, and it will be understood that a safety razor blade of any suitable type or design may be used.

It will also be understood that the head may be provided with a safety razor blade 21, similar to the blade 17, and also a blade 22 mounted above and positioned to coact with the blade 21 whereby the pod or shell of a pea will be cut on two opposite sides and the peas will be held in cutting relation with the blades with spring fingers 23 extending inwardly from the sides of a bore 24 in a head 25 whereby the shells are cut from end to end and the peas may be completely removed from the pods or shells. The spring fingers 23 are struck from a tube 26, similar to the tube 12, and the head 25 is provided with a handle 27, similar to the handle 11. The pea sheller may, therefore, be provided with a single blade or with a plurality of blades, as may be desired.

With the parts designed and assembled as shown and described, a pea pod, as indicated by the numeral 28, is forced into an inlet end 29 of the tube in the head 10 and urged into cutting relation with the blades by the spring guides whereby the pod is split by the blade 17. By this means both small and large peas are forced into cutting relation with the blade and the shell is completely opened.

It will be understood that modifications, within the scope of the appended claim, may be made in the design and arrangement of the parts, without departing from the spirit of the invention.

What is claimed is:

A pea sheller comprising a head having a handle extended therefrom and having a bore extending longitudinally therethrough, a tube having spring fingers struck therefrom and extended inwardly toward the center thereof and having a slot in one side positioned in the bore of the head of the sheller, and a cutting blade mounted in the head and positioned with a point thereof extended through the slot of the tube and into the intermediate part of the tube, said cutting blade being positioned in opposed relation to one of said spring fingers and also positioned between a pair of said spring fingers.

References Cited in the file of this patent

UNITED STATES PATENTS

| | | |
|---|---|---|
| 2,089,774 | Wachstein | Aug. 10, 1937 |
| 2,418,581 | Evernden | Apr. 8, 1947 |
| 2,528,402 | Watson | Oct. 31, 1950 |
| 2,619,968 | Severance | Dec. 2, 1952 |
| 2,731,970 | Hughes | Jan. 24, 1956 |